US010638374B2

United States Patent
Ye et al.

(10) Patent No.: US 10,638,374 B2
(45) Date of Patent: Apr. 28, 2020

(54) METHOD AND APPARATUS FOR REDUCING PACKET RETRANSMISSION DURING HANDOVER (HO) IN LOW LATENCY MOBILE COMMUNICATION NETWORKS

(71) Applicant: Futurewei Technologies, Inc., Plano, TX (US)

(72) Inventors: Yinghua Ye, Los Gatos, CA (US); Ulas Can Kozat, Mountain View, CA (US); Hang Shi, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/836,096

(22) Filed: Dec. 8, 2017

(65) Prior Publication Data
US 2019/0182717 A1    Jun. 13, 2019

(51) Int. Cl.
*H04W 36/12* (2009.01)
*H04W 36/00* (2009.01)
*H04W 36/16* (2009.01)
*H04W 36/38* (2009.01)

(52) U.S. Cl.
CPC ....... *H04W 36/0022* (2013.01); *H04W 36/12* (2013.01); *H04W 36/165* (2013.01); *H04W 36/38* (2013.01); *H04W 36/0055* (2013.01)

(58) Field of Classification Search
CPC ............. H04W 36/0022; H04W 36/38; H04W 36/165; H04W 36/12; H04W 36/0055
See application file for complete search history.

(56) References Cited

U.S. PATENT DOCUMENTS

| | | | | |
|---|---|---|---|---|
| 6,876,639 B1* | 4/2005 | Cao | ....................... | H04L 1/1607 370/331 |
| 2014/0064249 A1* | 3/2014 | Lee | ..................... | H04W 36/023 370/331 |
| 2016/0142959 A1 | 5/2016 | Wang et al. | | |
| 2018/0376384 A1* | 12/2018 | Youn | ................. | H04W 36/0022 |

FOREIGN PATENT DOCUMENTS

| | | |
|---|---|---|
| CN | 101237681 A | 8/2008 |
| CN | 102149150 A | 8/2011 |

OTHER PUBLICATIONS

Machine Translation and Abstract of Chinese Publication No. CN101237681, dated Aug. 6, 2008, 20 pages.

(Continued)

*Primary Examiner* — Thai Nguyen
(74) *Attorney, Agent, or Firm* — Conley Rose, P.C.

(57) ABSTRACT

Interruptions in communication due to user equipment (UE) handovers (HO) are signaled from the mobile communication network to the traffic source. For ultra-low latency and reliable communication, the signaling of HO start and completion notifications prevents retransmissions of in-flight packets by the traffic source, eliminating additional delays and inefficiencies. Signaling can be implemented by a network element, by a network element in conjunction with a smart traffic handler between the network and the traffic source (e.g., applications) and by a UE having at least two different radio interfaces.

10 Claims, 10 Drawing Sheets

(56) References Cited

OTHER PUBLICATIONS

Machine Translation and Abstract of Chinese Publication No. CN102149150, dated Aug. 10, 2011, 16 pages.
Foreign Communication From a Counterpart Application, PCT Application No. PCT/CN2018/119972, English Translation of International Search Report dated Feb. 27, 2019, 5 pages.
Foreign Communication From a Counterpart Application, PCT Application No. PCT/CN2018/119972, English Translation of Written Opinion dated Feb. 27, 2019, 4 pages.

* cited by examiner

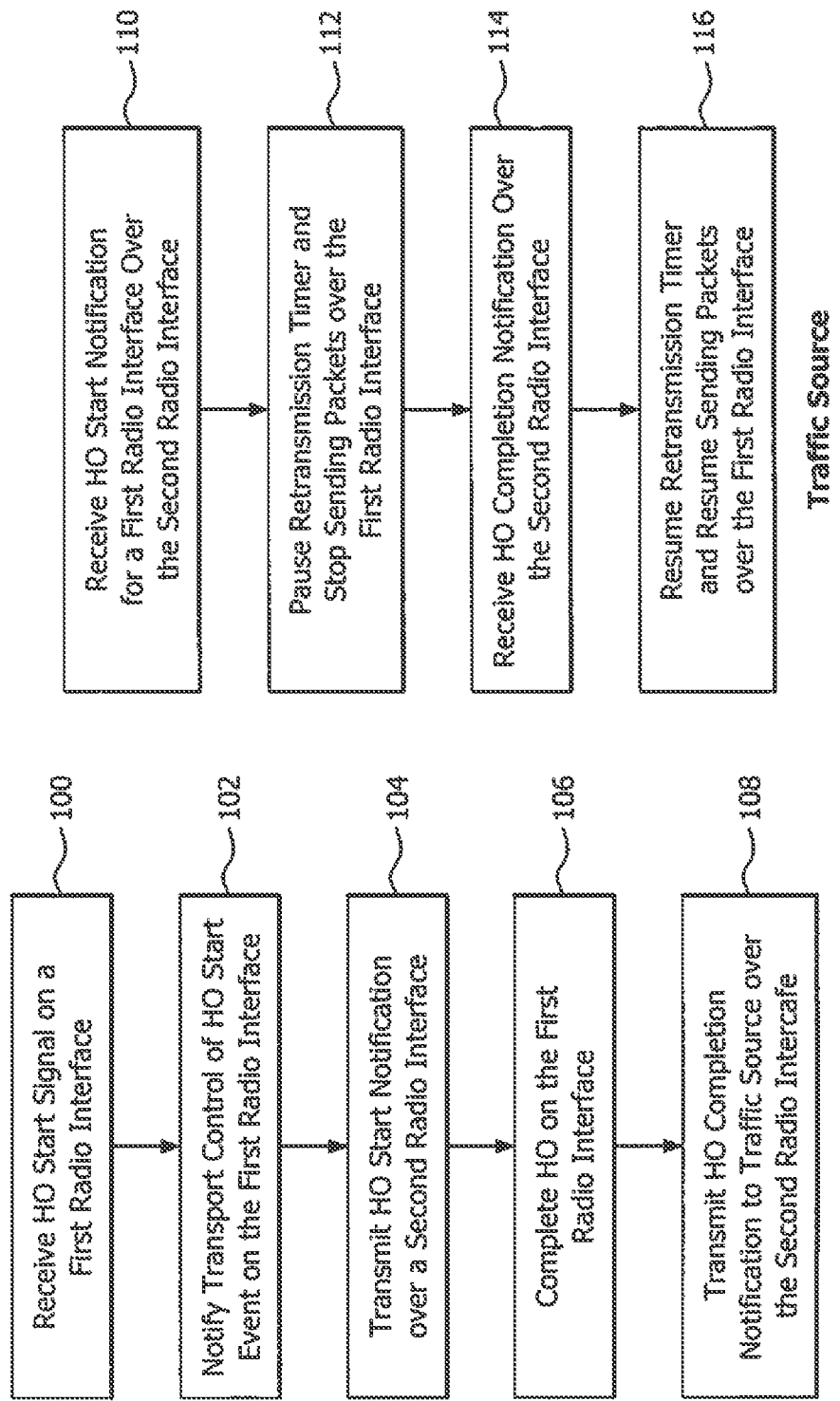

METHOD AND APPARATUS FOR REDUCING PACKET RETRANSMISSION DURING HANDOVER (HO) IN LOW LATENCY MOBILE COMMUNICATION NETWORKS

TECHNICAL FIELD

The embodiments of the invention relate to wireless communications and, more particularly, to a system and method for supporting ultra-low latency and reliable communication by preventing retransmissions of in-flight packets by a traffic source during a handover (HO) of user equipment (UE) from one base station to another.

BACKGROUND

As technology advances, new products and services are created that have new communication requirements in terms of throughput, signal quality and transmission delay. Many of these new use cases such as augmented reality/virtual reality (AR/VR), gaming, self-driving cars, remote medical imaging, etc., require low latency and reliability. For example, some transmissions require about a 1 millisecond end-to-end latency and/or lossless transmissions such that retransmissions occur if packets are lost. Most of these use cases utilize Transmission Control Protocol (TCP), where the end-to-end transport control keeps track of which packets are acknowledged and which packets require retransmission. If an acknowledgement signal (ACK) is not received within a timeout period for a packet, then the packet is retransmitted.

A new user plane for a future generation network (e.g., 5G) has end-to-end latency that is significantly less than HO duration and a small retransmission timeout period. As a result, traffic sources are more likely to retransmit packets already buffered in the network due to the mobility management mechanism, thereby causing excessive duplication in high data rate communications and more latency.

Problems that occur when HO duration ($T_h$) is significantly greater than round trip time (RTT), that is, the duration for a small Internet Protocol (IP) packet to travel from a traffic source through the network to a destination, and back, will now be illustrated with reference to FIG. 1. FIG. 1 depicts a mobile communication network 16 wherein a UE 22 undergoes a HO from a first base station (e.g., a source E-UTRAN NodeB (SeNB)) 14a to a second base station (e.g., target eNB (TeNB)) 14b. In high-speed networks, a traffic source 20 sends a relatively large number of packets. The traffic source sets a retransmission timeout period as $\alpha \times RTT$ (where $\alpha > 1$, but small). The traffic source is self-clocked by ACKs from the UE 22. In other words, the traffic source 20 sends more packets as more ACKs are received from the UE 22. Once a packet's retransmission timeout period expires, the subsequent in-flight packets also expire and are retransmitted and clocked by the ACK of earlier packets. During HO, in-flight packets are buffered in the network 16 and the UE 22 is in an outage state (e.g., the UE 22 cannot transmit or receive any packets). Since HO time is much greater than end-to-end retransmission timeout, all in-flight packets before the handover (i.e., $P_1$ to $P_K$) expire and are retransmitted by the traffic source 20, which creates congestion and more latency after HO is completed.

SUMMARY

In accordance with aspects of an illustrative embodiment, a method is provided for reducing retransmission between a traffic source and a user equipment (UE) during UE handover (HO) in a mobile communication network, comprising: upon detection of UE HO, generating and transmitting to the traffic source a HO start notification to indicate that an outage time window is beginning; determining that UE HO is substantially complete or is complete; and generating and transmitting to the traffic source a HO completion notification to indicate that the outage time window is closed. For example, generating and transmitting the HO start notification and the HO completion notification is performed by a mobile communication network component. For example, the mobile communication network component is selected from a group consisting of a network exposure function component (NEF) when the network is a 5G network and a service capability exposure function component (SCEF) when the network is a 4G network.

In accordance with aspects of an illustrative embodiment, the mobile communication network component is a NEF, the traffic source is at least one internet protocol (IP)-based application running on an application server, and the generating and transmitting a HO start notification further comprises the steps of: querying, by the NEF, a user plane function component (UPF) to receive application flow information associated with the UE; and generating and transmitting, by the NEF, a HO start notification to each application associated with the UE based on the application flow information. The HO start notification indicates to the application that packet traffic transmitted from the application to the UE is temporarily interrupted during HO and to stop sending packet traffic to the UE.

In accordance with aspects of an illustrative embodiment, the generating and transmitting a HO completion notification further comprises generating and transmitting, by the NEF, a HO completion notification to each application associated with the UE based on the application flow information. The HO completion notification indicates to the application that packet traffic transmitted from the application to the UE is resuming following HO and to resume sending packet traffic to the UE.

In accordance with aspects of an illustrative embodiment, the mobile communication network component is a NEF, the traffic source is at least one internet protocol (IP)-based application running on an application server, and a smart traffic handler is provided between the network and the at least one application and operates as a Transmission Control Protocol (TCP) split proxy. Generating and transmitting the HO start notification further comprises generating and transmitting, by the NEF, a HO start notification to the smart traffic handler, and generating and transmitting the HO completion notification further comprises generating and transmitting, by the NEF, a HO completion notification to the smart traffic handler.

In accordance with aspects of an illustrative embodiment, generating and transmitting the HO start notification and the HO completion notification is performed by a UE. For example, the UE receives a HO start signal via a first radio interface. The UE has a second radio interface and a processor programmed to implement a transport control for communicating with at least one application server by the second radio interface and having running application information. Generating and transmitting the HO start notification to the traffic source comprises: providing the HO start signal to the transport control; and the transport control sending the HO start notification with a UE IP address via the second radio interface to the at least one application server based on the running application information, the HO start notification indicating the beginning of the outage time window for the first radio interface.

In accordance with aspects of an illustrative embodiment, in response to the UE receiving HO completion signal the first radio interface, the generating and transmitting to the traffic source the HO completion notification comprises: providing the HO completion signal to the transport control, and the transport control sending the HO completion notification via the second radio interface to the at least one application server, the HO completion notification indicating the closing of the outage time window for the first radio interface. The at least one application server pauses transmission of traffic to the UE via the first radio interface in response to the HO start notification, and resumes the transmission of traffic to the UE via the first radio interface in response to the HO completion notification.

In accordance with aspects of an illustrative embodiment, a network exposure function component (NEF) in a mobile communication network comprises: an Internet Protocol (IP) interface to an IP network; a network function (NF) message interface to other components of the mobile communication network, the NEF receiving user equipment (UE) handover (HO) start signals and HO completion signals from at least one of the other components of the mobile communication network via the network function message interface; a memory storage comprising instructions for communicating with applications running on at least one application server in the IP network, and for generating HO start notifications and HO completion notifications; and a processor in communication with the IP interface, the NF message interface and the memory storage, wherein the processor executes the instructions to generate and transmit a HO start notification to at least one of the applications via the IP interface after receiving a HO start signal via the NF message interface, and to generate and transmit a HO completion notification to the at least one of the applications via the IP interface after receiving a HO completion signal via the NF message interface, the HO start notification indicating that an outage time window is beginning, and the HO completion notification indicating that the outage time window is closed. For example, the processor executes the instructions to query a user plane function component (UPF) to receive application flow information associated with the UE comprising the applications to which the UE is subscribed and for which a session with UE is established during HO, and to generate and transmit the HO start notification and the HO completion notification to each application associated with the UE based on the application flow information.

In accordance with aspects of an illustrative embodiment, a smart traffic handler component (STH) comprises: an Internet Protocol (IP) interface to at least one application server in an IP network and to a mobile communication network component having an IP network interface; a memory storage comprising instructions for implementing at least one of a Transmission Control Protocol (TCP) split proxy and a User Datagram Protocol (UDP) packet handler, and for processing a HO start notification and a HO completion notification received from the mobile communication network component via the IP interface; and a processor in communication with the IP interface and the memory storage, wherein the processor executes the instructions to pause a TCP packet retransmission timer and begin an outage time window via the TCP split proxy in response to the HO start notification and then resume the TCP packet retransmission timer and close the outage time window in response the HO completion notification. Further, the processor executes the instructions to buffer packets directed to the UE from the application server, stop sending the packets to the UE from the application server in response to the HO start notification, and resume sending packets to the UE from the application server in response to the HO completion notification, via the UDP packet handler.

In accordance with aspects of an illustrative embodiment, a User Equipment (UE) in a mobile communication network comprises: a first radio interface connecting the UE to the mobile communication network; a second radio interface connecting the UE to an Internet Protocol (IP) network; a memory storage comprising one or more applications running on the UE and instructions for implementing a transport control for communication between the applications and their corresponding application servers in the IP network, the transport control comprising running application information indicating the applications to which the UE is subscribed and with which the UE is having a session; and a processor in communication with the IP interface and the memory storage, wherein the processor executes the instructions to provide a handover (HO) signal received via the first radio interface to the transport control, to send via the transport control a HO start notification with a UE IP address via the second radio interface to at least one of the application servers based on the running application information, the HO start notification indicating the beginning of the outage time window for the connection established over the first radio interface. For example, in response to the UE receiving a HO completion signal via the first radio interface, the processor executes the instructions to send via the transport control a HO completion notification via the second radio interface to the application server, the HO completion notification indicating the closing of the outage time window for the first radio interface.

Additional and/or other aspects and advantages of the present invention will be set forth in the description that follows, or will be apparent from the description, or may be learned by practice of the invention. The present invention may comprise software, APIs, non-transitory memory with instructions, network elements, UEs and application servers and methods for operating same having one or more of the above aspects, and/or one or more of the features and combinations thereof. The present invention may comprise one or more of the features and/or combinations of the above aspects as recited, for example, in the attached claims.

BRIEF DESCRIPTION OF THE DRAWINGS

The above and/or other aspects and advantages of embodiments of the invention will be more readily appreciated from the following detailed description, taken in conjunction with the accompanying drawings, of which:

FIGS. 11A and 11B are flow charts depicting operations by a UE and a traffic source, respectively, for reducing packet retransmission during HO in a mobile communication network in accordance with an illustrative embodiment.

Throughout the drawing figures, like reference numbers will be understood to refer to like elements, features and structures.

DETAILED DESCRIPTION OF ILLUSTRATIVE EMBODIMENTS

In accordance with an advantageous aspect of embodiments of the invention, signaling (e.g., from the mobile communication network to a traffic source) of interruptions in communication due to UE HOs is used to prevent retransmissions of in-flight packets by the traffic source, thereby eliminating additional delays and inefficiencies to support ultra-low latency and reliable communication. As described below, illustrative embodiments send HO start and completion notifications to a traffic source. A traffic source is, for example, an application (App) in an operator domain or third party application, or a proxy, etc., that sends packets to a UE. The traffic source can then pause a retransmission timer to open an outage time window to avoid packet retransmission during HO, optionally stop sending traffic to a UE when that UE is in HO mode, and then resume the retransmission timer to close the outage time window when HO is completed.

The illustrative embodiments are implemented using either one of two techniques for reducing retransmissions. For the first technique, a component in the network 16 sends the traffic source 20 two signals, that is, a first signal hereinafter referred to as a "HO start notification" to indicate the start of a HO, and a second signal hereinafter referred to as a "HO completion notification" to indicate the completion of the HO. The traffic source 20, in turn, pauses its retransmission timer after receiving the HO start notification to begin an outage time window during which no packets are retransmitted to the UE, and resumes the retransmission timer after receiving the HO completion notification to close the outage time window and resume retransmission of packets. The traffic source 20 can optionally stop sending new packets between receiving the HO start notification and then receiving the HO completion notification. For the second technique, a UE 22 is attached to multiple radio interfaces (e.g., a mobile communication network interface and a WiFi interface), and the HO start notification and the HO completion notification are sent to the traffic source 20 by the UE 22 rather than a network 16 component.

Figure 1:
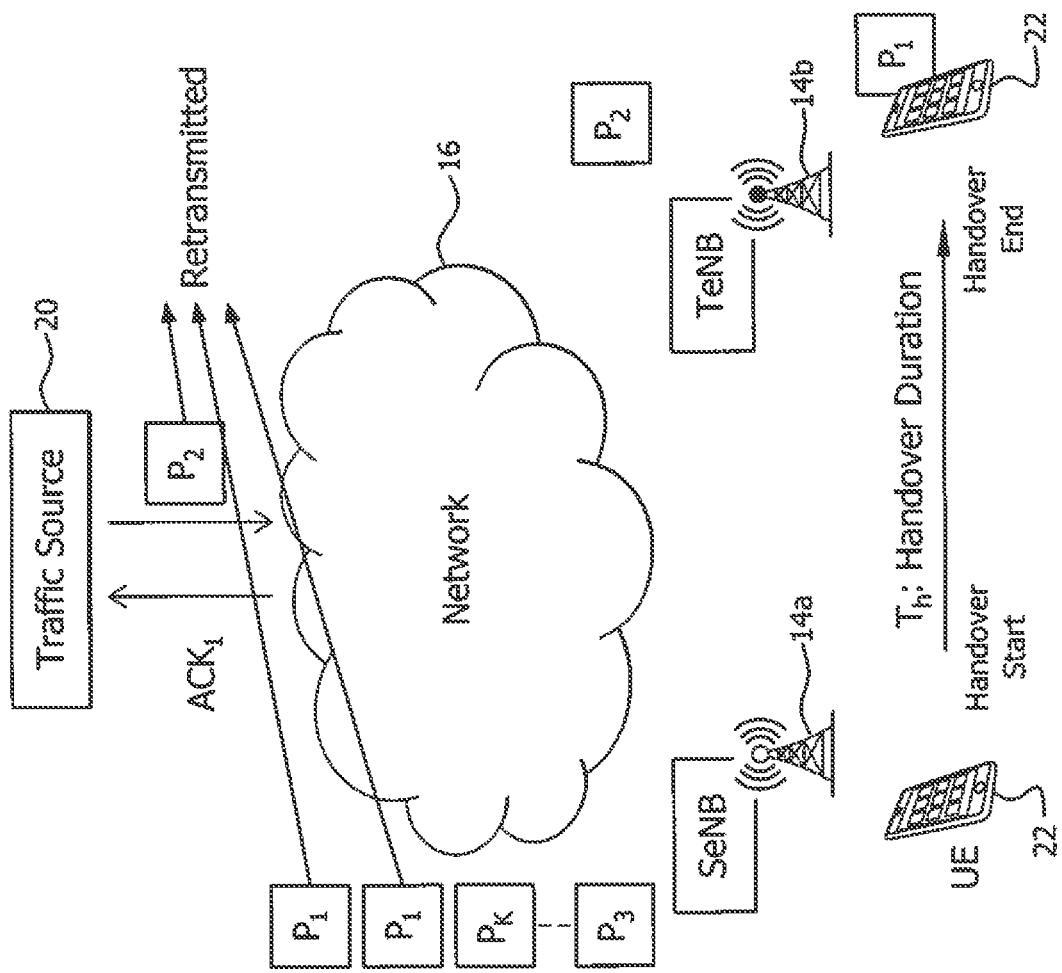
FIG. 1 illustrates a UE undergoing HO in a mobile communication network and packet retransmission.
Figure 2:
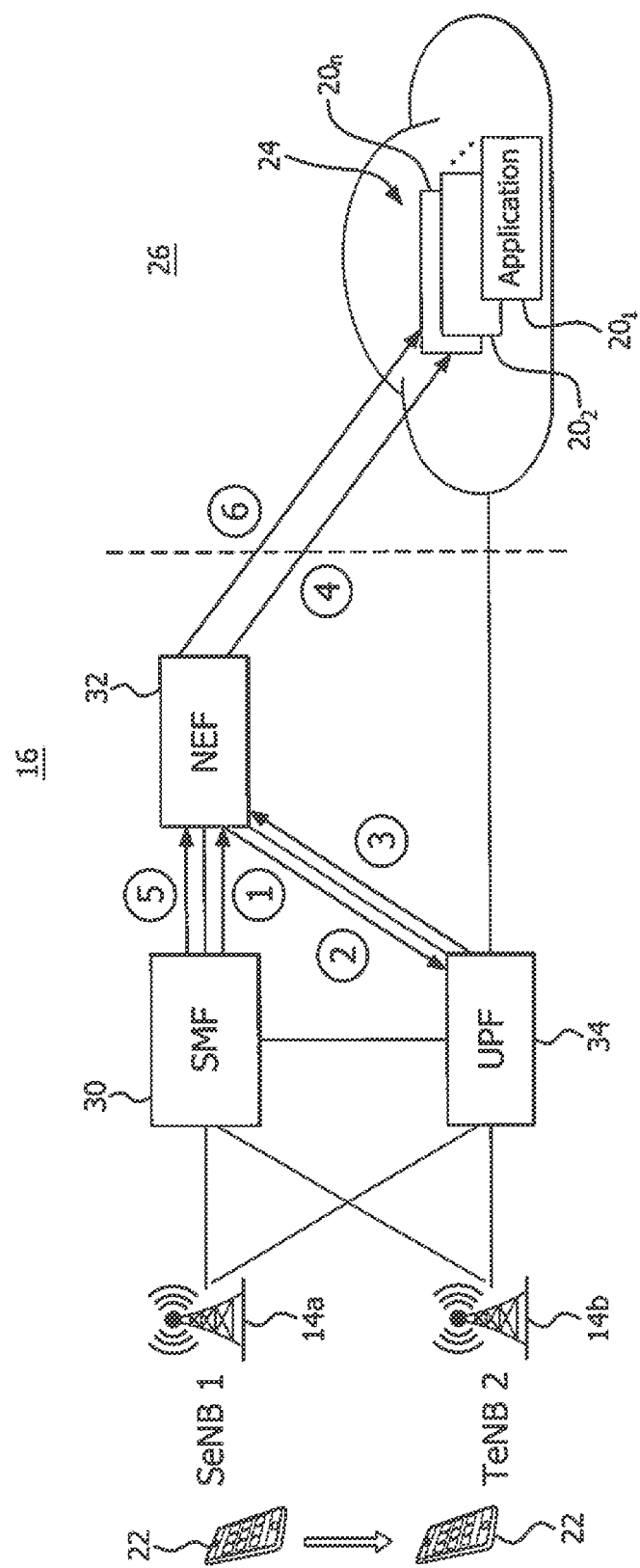
FIG. 2 is a diagram depicting a system wherein mobile communication network components provide HO notifications to traffic sources such as applications to reduce packet retransmissions during HO in accordance with an illustrative embodiment.
Figure 3:
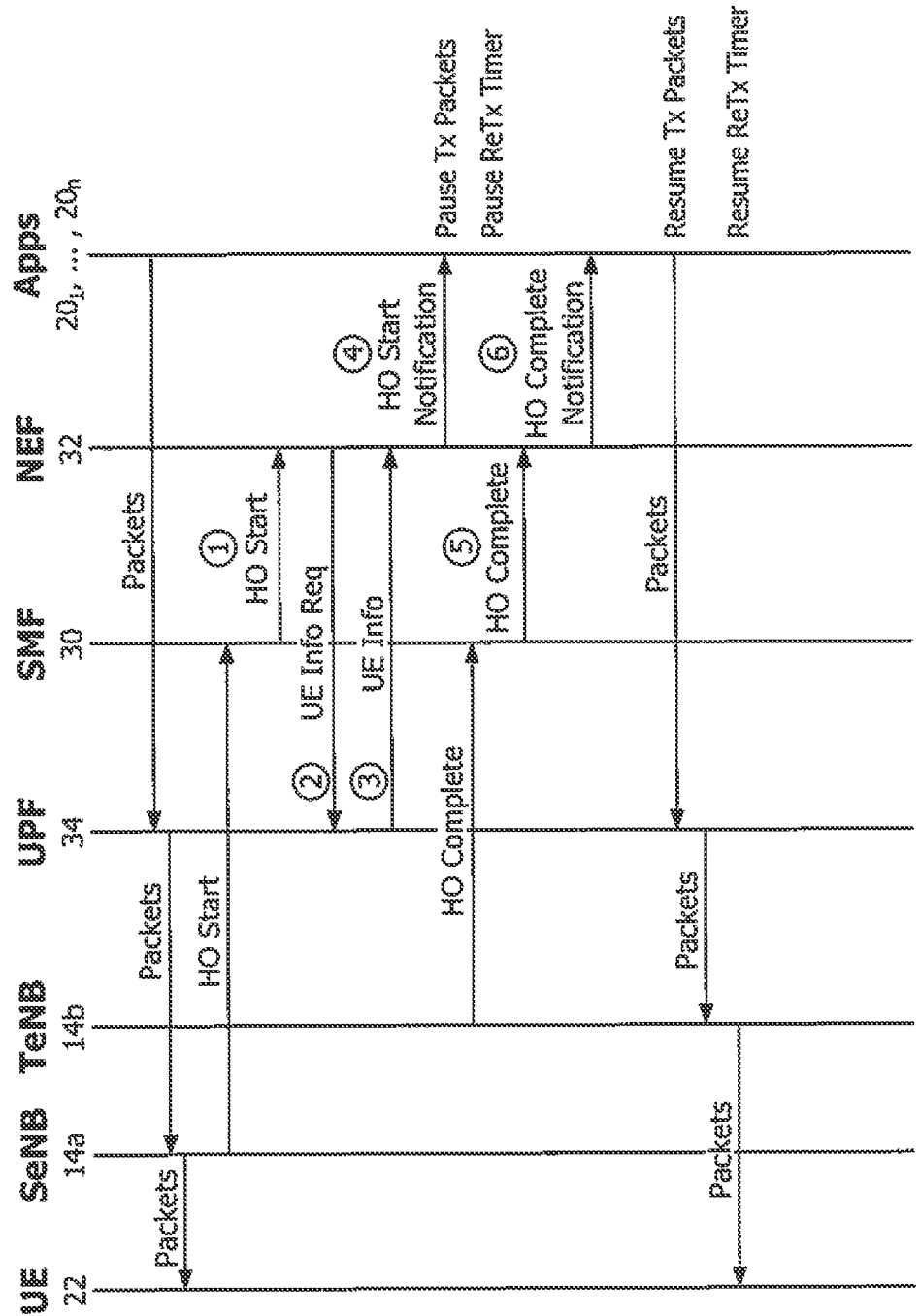
FIG. 3 illustrates signal flow of components in the system of FIG. 2.

FIGS. 2 and 3 illustrate an embodiment using the first technique whereby a network component 32 in a mobile communication network 16 sends HO start notifications and the HO completion notifications to a traffic source 20. FIG. 2 illustrates various components in a mobile communication network 16 and in an IP network 26, and FIG. 3 depicts signal flow between the components. The network 16 is shown as a fifth generation (5G) mobile communication network; however, it is understood that the network 16 can be a third Generation (3G) Partnership Project standard (3GPP) network or a fourth generation (4G) Long Term Evolution (LTE) mobile communication network, for example. Traffic sources such as IP network-based Apps 20 send packets to a UE 22 via a user plane function (UPF) 34. A UE 22 undergoes HO from a SeNB 14a to a TeNB 14b. For HO in a 4G LTE network, a mobility management entity (MME) receives a HO request signal from a SeNB and commands handover, and receives notification from a TeNB when HO is complete. Similar signals are provided from a SeNB and a TeNB to a session management function (SMF) 30 in a 5G network. The SMF 30 communicates HO start and completion signals to a network component 32 such as a service capability exposure function (SCEF) in a 4G network or a network exposure function (NEF) in a 5G network which, in turn, provide HO start and completion notifications to traffic sources 20. As illustrated by the lines labeled "1" through "6" in FIGS. 2 and 3, the following actions 1 through 6 occur in accordance with the illustrated embodiment:

1. When the SMF 30 receives a signal indicating the beginning of HO from the SeNB 14a, the SMF 30 sends the NEF 32 a signal with UE identity (e.g., international mobile subscriber identity (IMSI)) that is indicated as "HO Start" in FIG. 3.

2. Upon receiving the HO start signal from the SMF 30, the NEF 32 queries the UPF 34 to get flow information associated with the UE 22. The flow information pertains to those applications 20 to which the UE 22 is subscribed and for which a session is currently established with the UE 22. As described below in accordance with an aspect of the illustrated embodiment, Apps 20 are configured to receive HO start notifications and HO completion notifications when the UE is subscribed to the Apps and engaged in existing sessions with them during HO. The UPF 34 receives flow information from the Apps pertaining to the network identifiers of subscribed UE in existing sessions with the Apps. In some instances, an App 20 may only be able to provide the UPF 34 with its end point information (e.g, server IP address and port number of App server 24 for the App 20) when a UE network identifier of a subscribed UE engaged in a session with the App is hidden (e.g., when the UE is behind a network address translator (NAT)). In these instances, the end points provided to the UPF 34 that have subscription context for the UE are sent HO start notifications and HO completion notifications.

3. The UPF 34 responds to the NEF 32 with the flow information relating to the UE 22.

4. The NEF 32 sends HO start notifications to the relevant Apps 20 that send traffic to the UE 22 (e.g., based on the flow information acquired in step 3). Each of the Apps 20 stops sending packets to the UE 22. For example, upon receiving a HO start notification, the App 20 begins an outage time window by pausing a retransmission timer via its application server 24. The outage time window is later closed by resuming the retransmission timer upon receiving a HO completion notification.

5. The NEF 32 receives from the SMF 30 a signal with the UE's IMSI and indicating that HO is almost complete. The signal from the SMF 30 is indicated as "HO Complete" in FIG. 3.

6. The NEF 32 sends HO completion notifications to the relevant Apps 20 based on the flow information. Each of the Apps 20 resumes sending packets to the UE 22, and closes the outage time window by resuming the retransmission timer upon receiving the HO completion notification.

Figure 4B:
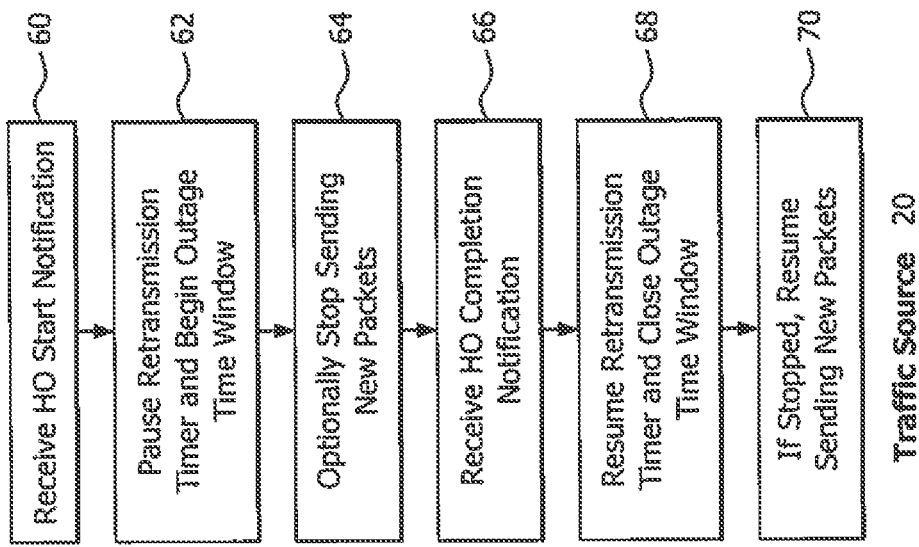
FIGS. 4A and 4B are flow charts depicting operations by a mobile communication network component and a traffic source, respectively, for reducing packet retransmission during HO in a mobile communication network in accordance with an illustrated embodiment.
Figure 4A:
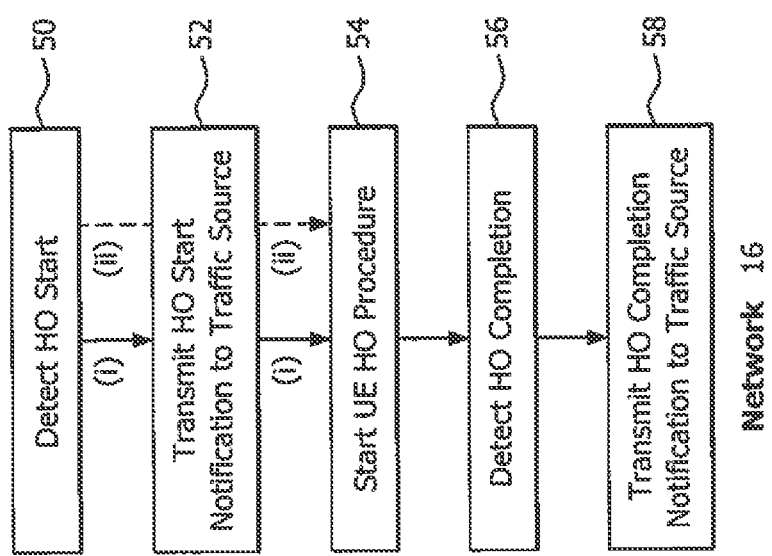

As stated above, the mobile communication network 16 can be a 3GPP or 4G LTE network, or other mobile communication network besides a 5G network, wherein a MME, SCEF and a serving/packet data network gateway (S/P GW) are used, for example, in place of the SMF, NEF and UPF described in connection with FIG. 2. The explicit HO start notifications and HO completion notifications provided to the traffic sources 20 from the network 16 as described herein and in accordance with illustrative embodiments can be implemented using different mobile communication network components in different types of communication networks. Regardless of the type of network 16, a network component such as an MME in a 4G network or a SMF 30 detects HO start as indicated in block 50 of FIG. 4A, and then a HO start notification is transmitted to the traffic source(s) 20 (e.g., Apps), as indicated in block 52, such as by an SCEF in a 4G network or a NEF 32. As indicated by arrows (ii) in FIG. 4A, an alternative signaling sequence can be used whereby the network 16 does not have to wait for the completion of HO start notification to the traffic source(s) to commence UE HO procedure. The network 16 commences the UE HO procedure (block 54) and, once completion of HO is detected (block 56) by the MME or SMF 30, a HO completion notification is generated and transmitted to the traffic source(s) (block 58) by the SCEF or NEF 32. On the traffic source side (FIG. 4B), a traffic source receives the HO start notification (block 60), and then pauses a retransmission timer (block 62), and optionally stops sending new packets (block 64). When the traffic source receives the HO completion notification (block 66), the traffic source resumes the retransmission timer (block 68) and, if the sending of packets was paused, then the traffic source resumes sending new packets (block 70).

It is understood that a Protocol Independent Network Condition Service (PINCS) can provide the HO start signals and the HO completion signals to the NEF 32 instead of an SMF 30. A PINCS, for example, can be part of a network congestion controller that also comprises a network condition consumer (NCC) node and a network condition provider (NCP) node. The PINCS is operable to aggregate information about network conditions and send the aggregated information to NCC node as indicated by the subscription. The NCP applies the subscribed network condition information to a congestion control algorithm to implement congestion control on the network. A PINCS is described in U.S. patent application Ser. No. 15/796,183, filed Oct. 27, 2017, which is incorporated herein by reference in its entirety. The SMF 30, UPF 34 and NEF 32 depicted in FIG. 2 can be implemented, for example, as a network element on a dedicated hardware, or a software instance running on a dedicated hardware, or as a virtualized function instantiated on an appropriate platform such as a cloud infrastructure.

Figure 5:
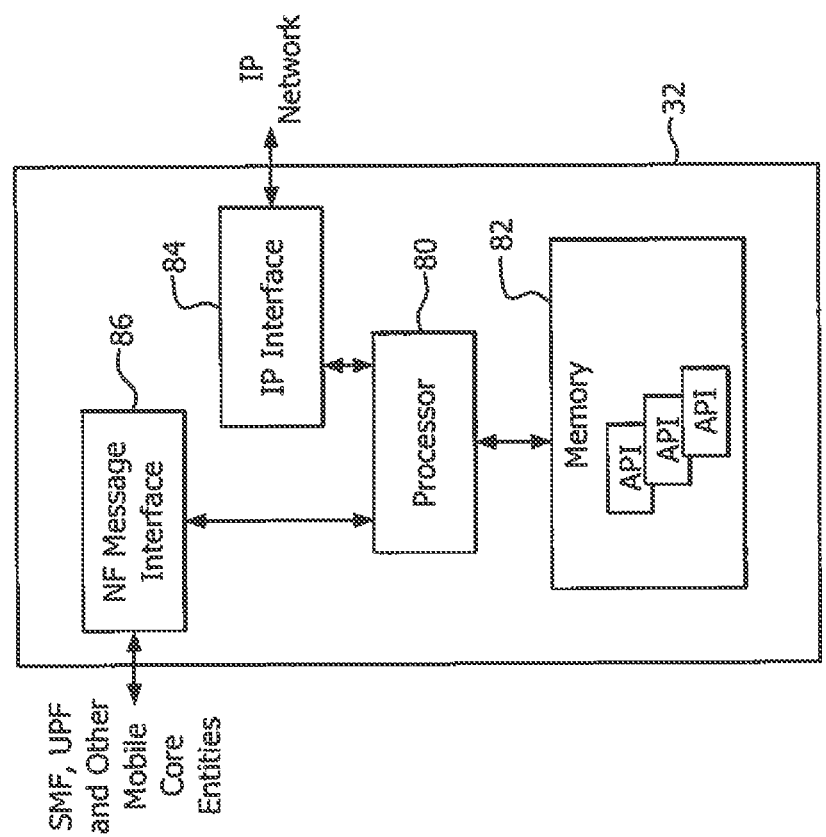
FIG. 5 is a block diagram of a network exposure function component (NEF) in accordance with an illustrative embodiment.

FIG. 5 depicts an example NEF 32 for transmitting HO start notifications and HO completion notifications to a traffic source(s) 20. The NEF 32 comprises a network function (NF) message interface 86 for communicating with other mobile core entities such as with the SMF 30 to receive signals indicating HO start and HO completion and with the UPF 34 to obtain UE flow information. The NEF 32 further comprises an IP interface 84 for communicating with entities in an IP network 26 such as application servers 24 and Apps 20. The NEF 32 can have a processor 80 configured to implement software instructions stored in memory 82 to control its operations. For example, the instructions can be a set of application programming interfaces (APIs) at the network 16 boundary to the IP network 26 for communicating with Apps 20 running on at least one application server 24 in the IP network 26 to send HO start notifications and HO completion notifications based on flow information obtained from the UPF 34 and in response to HO start signals and HO completion signals, respectively, received from the SMF 30.

Figure 6:
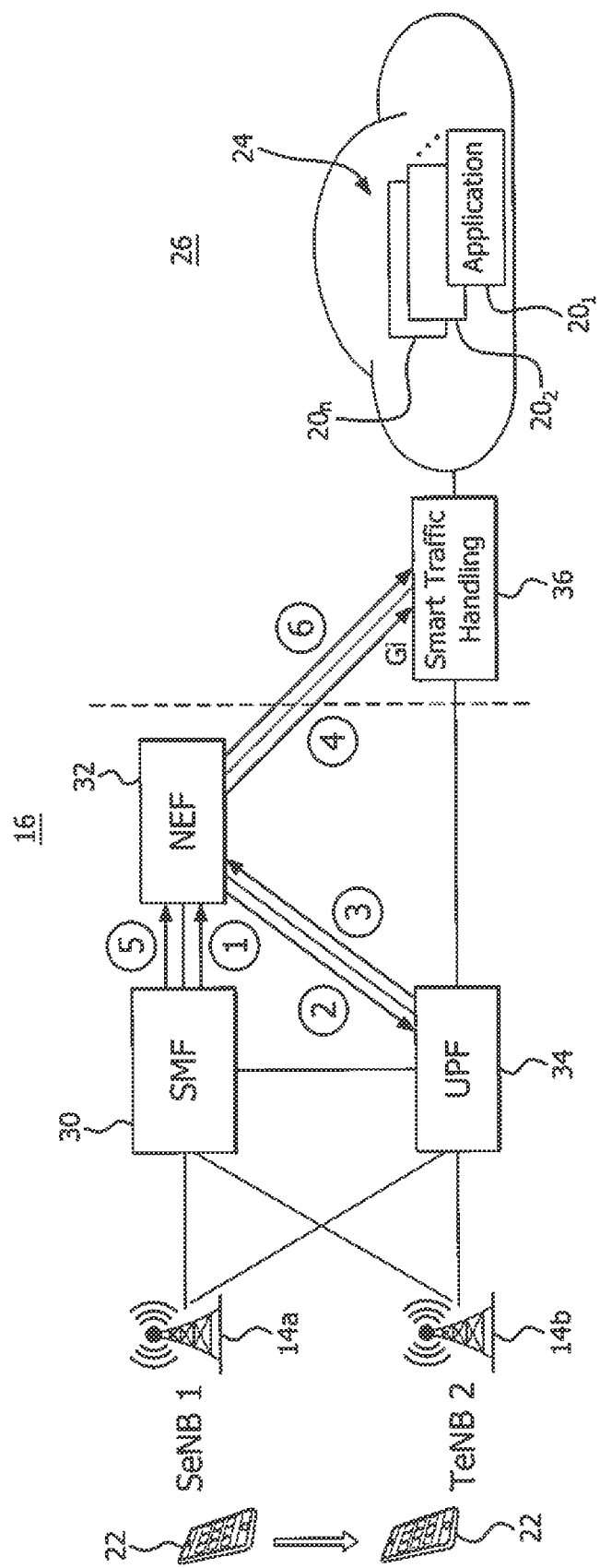
FIG. 6 is a diagram depicting system wherein mobile communication network components are configured to provide HO notifications to a smart traffic handler component (STH) in accordance with an illustrative embodiment.
Figure 7:
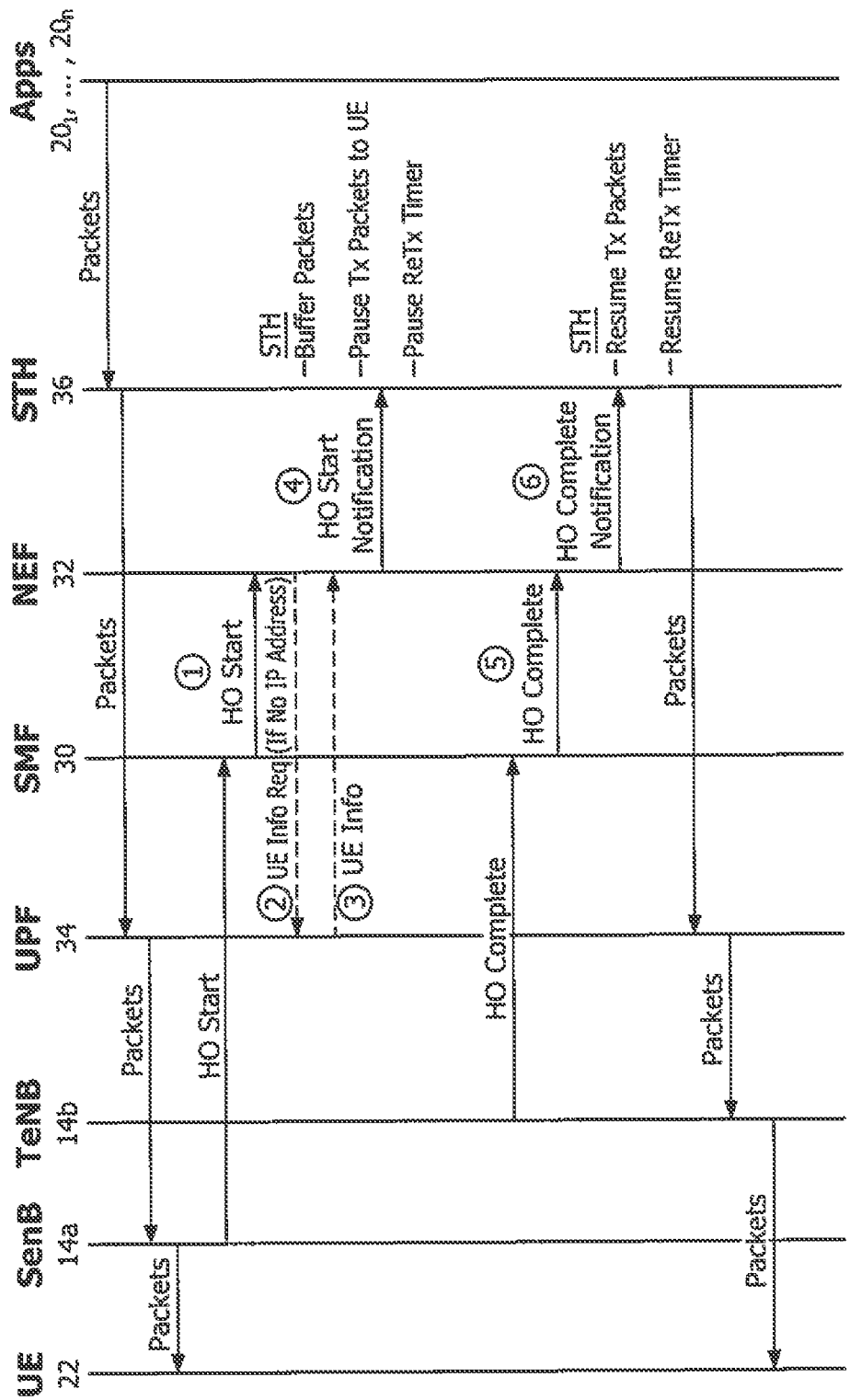
FIG. 7 illustrates signal flow of components in the system of FIG. 5.

FIGS. 6 and 7 illustrate another embodiment using the first technique whereby a network component 32 in a mobile communication network 16 sends HO start notifications and the HO completion notifications to a smart traffic handing component (STH) 36 in the IP network 26 instead of the traffic source 20 as described in FIGS. 2 and 3. FIGS. 6 and 7 are similar to FIGS. 2 and 3, respectively, except for the addition of the STH 36. The STH 36 is an interface between the mobile communication network 16 and applications 20 accessible via app server(s) 24 in the IP network 26 and can operate as a TCP split proxy and a User Datagram Protocol (UDP) packet handler. For example, when the SMF 30 receives a signal indicating commencement of HO for a UE 22, the following actions 1 through 6 occur:

1. When the SMF 30 receives a signal indicating the beginning of HO from the SeNB 14a, the SMF 30 sends a HO start signal with UE identity (IMSI), or UE IP address if IP address is statically allocated, to the NEF 32.

2. Upon receiving the HO start signal, the NEF 32 uses the IMSI to query the UPF 34 to get the UE IP address. On the other hand, if the notification includes the UE IP address, this action is obviated.

3. The UPF 34 responds to the NEF 32 with the UE IP address if queried.

4. The NEF 32 sends a HO start notification with UE IP address to the STH 36. When the HO start notification is received, the STH 36 controls a TCP packet retransmission timer for its TCP split proxy function to avoid packet retransmission during HO. The TCP split proxy of the STH 36 interacts with applications 20 as if nothing occurs. In other words, HO start or completion notifications are not sent to the applications 20, and the applications do not pause transmission of packets or pause retransmission timers. Instead, the TCP split proxy of the STH 36 begins an outage time window (e.g., by pausing the TCP retransmission timer), stops sending packets towards the UE 22, and buffers those packets. The STH 36 also buffers UDP packets going to the UE 22 using the UDP packet handler.

5. When the SMF 30 receives a signal indicating that HO is almost done, the SMF 30 sends a HO completion signal to the NEF 32.

6. The NEF 32 notifies the STH 36 about the UE 22's HO completion, and the TCP split proxy of the STH 36 closes the outage time window (e.g., by resuming the TCP packet retransmission timer), and starts sending packets to the UE 22. For UDP packets, STH 36 simply forwards the packets to the UE 22.

Figure 8:
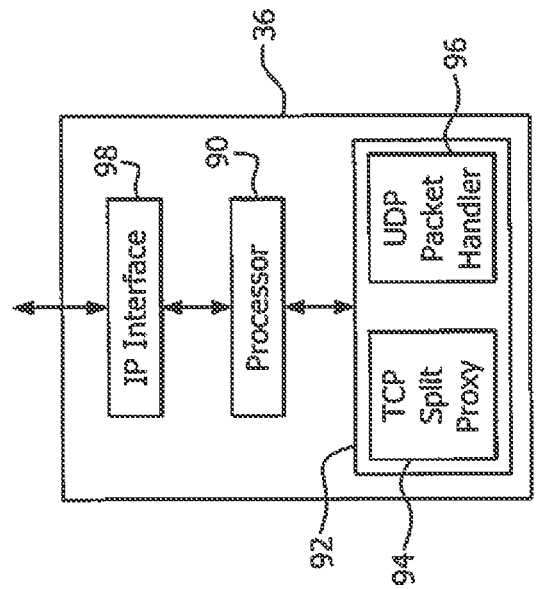
FIG. 8 is a block diagram of a STH in accordance with an illustrative embodiment.

FIG. 8 depicts an example STH 36 configured for receiving HO start notifications and HO completion notifications from an NEF 32 and communicating with traffic source(s) 20. The STH can be dedicated hardware, or a virtualized function instantiated on an appropriate platform such as a cloud infrastructure. The STH 36 comprises, for example, an IP interface 98 for communicating with the NEF 32 and entities in the IP network 26 such as application servers 24 and Apps 20. Further, the STH 36 can have a processor 90 configured to implement software instructions stored in memory 92 to control its operations such as its TCP split proxy operations 94 and UDP packet handler operations 96.

With continued reference to FIGS. 6 and 7, it is understood that a PINCS can provide the HO start and HO completion signals to the NEF instead of an SMF, as stated above in connection with FIGS. 2 and 3. Further, in a 3GPP or 4G LTE network, or other mobile communication network besides a 5G network, a MME, SCEF and S/P GW are used in place of the SMF/PINCS, NEF and UPF described in connection with FIGS. 2 and 3 in accordance with an illustrative embodiment. The explicit HO start and completion notifications to the STH described herein and in accordance with illustrative embodiments can be implemented using different mobile communication network components in different types of communications networks.

Figure 9:
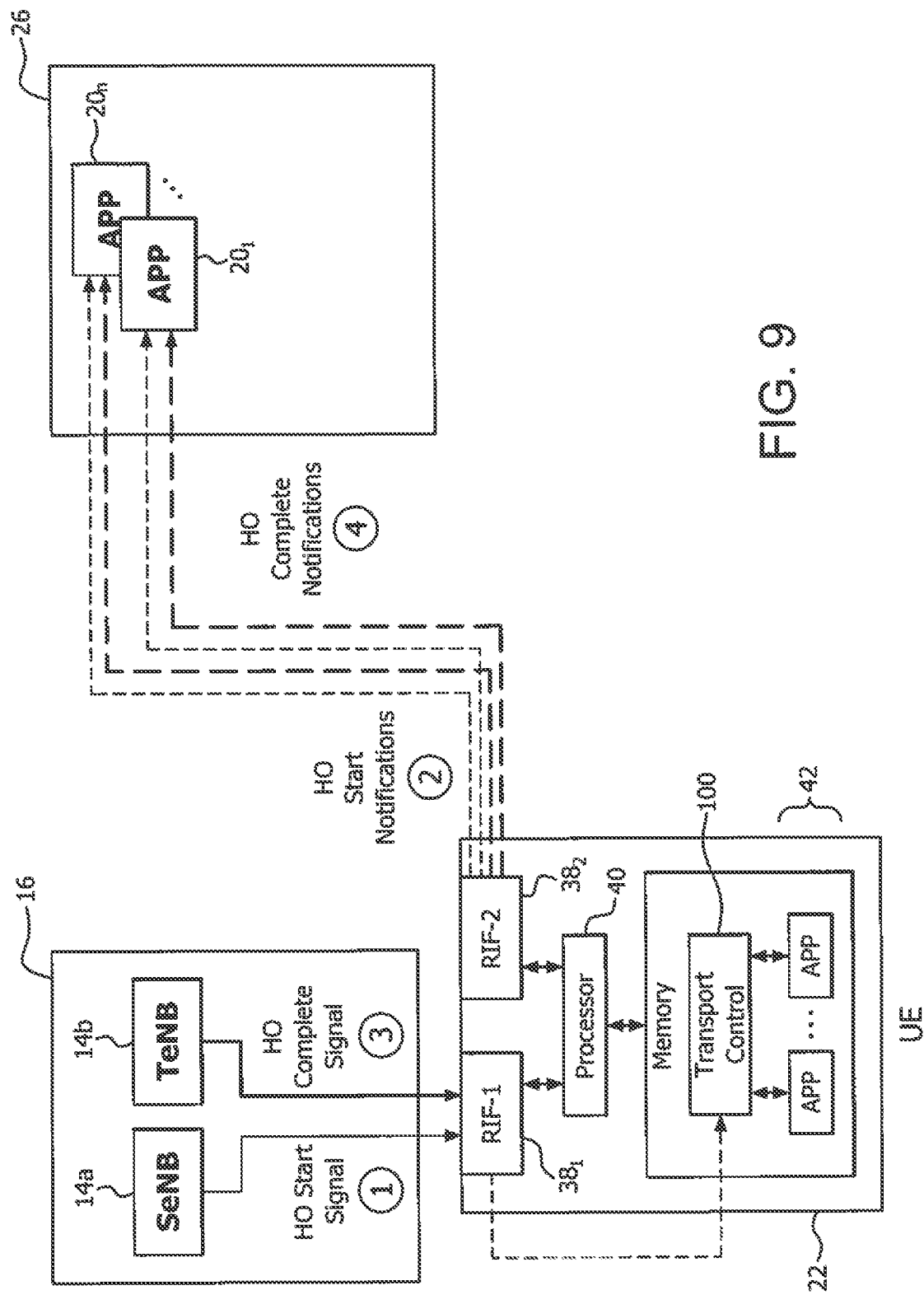
FIG. 9 is a diagram depicting a system wherein a user equipment (UE) is configured to provide HO notifications to traffic sources such as applications in accordance with an illustrative embodiment.
Figure 10:
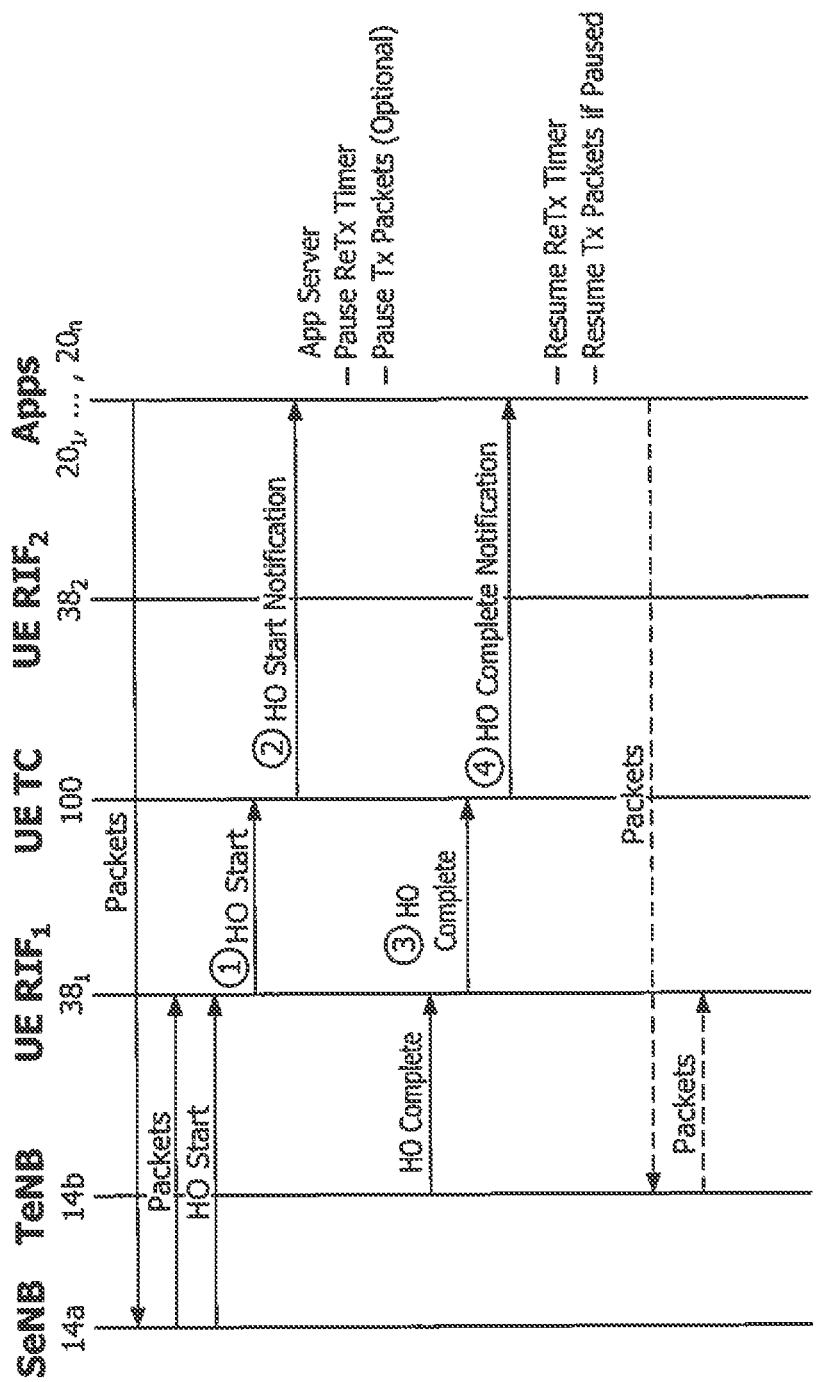
FIG. 10 illustrates signal flow of components in the system of FIG. 9.

FIGS. 9 and 10 depict another illustrative embodiment employing the second technique wherein a UE 22 sends notifications to the traffic source 20 regarding HO status. The second technique employs dual connectivity where a UE is attached to multiple radio interfaces (e.g., a mobile communication network interface and a WiFi interface), and utilizes a transport layer that delivers over these multiple radio interfaces. In FIGS. 9 and 10, a UE 22 undergoes HO in a mobile communication network 16 between SeNB 14a and TeNB 14b. The UE 22 has at least two different radio interfaces RIF-1 $38_1$ and RIF-2 $38_2$ such as a mobile communication network interface and a WiFi interface, respectively. Other combinations of radio interfaces can be used. The UE 22 communicates with traffic sources such as IP network-based applications 20 available via app server(s) 24. For example, the following actions 1 through 4 occur:

1. When a UE 22 learns about a HO start signal from an SeNB 14a via the RIF-L $38_1$ (step 100 in FIG. 11A), the HO start signal is passed to transport control 100, which has the running applications' information as indicated at 42 (step 102 in FIG. 11A).

2. The transport control 100 sends HO start notifications with UE IP address to the app servers 24 running on the IP network 26 via the RIF-2 $38_2$, as indicated at step 104 in FIG. 11A When the app servers 24 receive the HO start notifications (step 110 in FIG. 11B), the app servers 24 begin an outage time window to avoid retransmission of packets during HO (e.g., by pausing a retransmission timer), and optionally stop sending traffic to the UE via its network 16 interface RIF-1 $38_1$, as indicated in step 112 of FIG. 11B.

3. When the UE 22 learns that HO is complete from the TeNB 14b via the RIF-1 $38_1$ (step 106 of FIG. 11A), a HO complete signal is passed to the transport control 100.

4. The transport control 100 at the UE 22 sends HO complete notifications to the app server(s) 24 via the RIF-2 $38_2$ (step 108 of FIG. 11A). When the app server(s) 24 receive the HO completion notifications (step 114 in FIG. 11B), the app servers 24 resume the retransmission timer to close the outage time window and resume sending traffic to the UE 22 via its network 16 interface RIF-1 $38_1$, if previously paused, as indicated in step 116 of FIG. 11B Illustrative embodiments advantageously enable explicit signaling of interruptions in communication due to UE handovers from the network 16 or UE 22 to the traffic source(s) 20. For ultra-low latency and reliable communication, this signaling prevents retransmissions of in-flight packets by the traffic source, thereby eliminating additional delays and inefficiencies.

The HO start and completion notifications of the illustrative embodiments are implemented, for example, by a set of APIs for a mobile core network which provide improved support for low latency applications and allow for a more efficient transmission pipeline by preventing duplicate transmissions of packets. Illustrative embodiments can also be implemented as edge transport proxy services or functions.

Illustrative embodiments of the present invention are useful in an event-driven environment where the transport control at an application or network entity can wait for HO start and completion notifications. In accordance with an aspect of the illustrative embodiments, the messages and interfaces for HO start and completion notifications exchanged between the mobile core platform and the transport control layers can be standardized for compatibility and use by different core networks and UE such as Internet Engineering Task Force (IETF) Transport Layer Extensions (e.g., QUIC, BBR, TCP, MP-TCP, and the like), and Open Networking Foundation (ONF) Software-Defined Networking (SDN) APIs.

Accordingly, illustrative embodiments advantageously provide simpler mobility management solutions that offload packet buffering to the transport control layer, as well as provide a solution to an emerging problem that is inadequately addressed by existing solutions. For example, no solution exists in the area of mobile communication networks to address HO time being significantly greater than round trip time and therefore presenting a new problem. Existing solutions are generally outside 3GPP Mobility Management, and mainly adapt against end point network identifier changes, rely on end-to-end signals, and cannot handle outages. These existing solutions are not aware of changes in HO state or outages due to HO but rather only rely on historical data regarding transmissions. These existing solutions merely make transmission scheduling decisions based on the historical data and signal quality capability, neither of which are known at the application layer or TCP layer of the Internet Protocol suite. By contrast, illustrative embodiments of the present invention advantageously expose HO events, allowing HO information to be provided for scheduling decisions.

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A method implemented by a mobile communication network component for reducing retransmission between a traffic source and a user equipment (UE) during UE handover (HO) in a mobile communication network, the method comprising:
  querying, by the mobile communication network component upon detection of the UE HO, a second mobile communication network component to receive application flow information associated with the UE, the application flow information identifying applications to which the UE is subscribed and for which a session with the UE is established during the UE HO;
  transmitting, by the mobile communication network component, a HO start notification toward the traffic source associated with the UE based on the application flow information, the HO start notification indicating that an outage time window is beginning;
  determining that the UE HO is complete; and
  transmitting, by the mobile communication network component, a HO completion notification toward the traffic source to indicate that the outage time window is closed.

2. The method of claim 1, wherein the mobile communication network component comprises a network exposure function component (NEF) when the mobile communication network is a fifth generation (5G) network and the mobile communication network component comprises a service capability exposure function component (SCEF) when the mobile communication network is a fourth generation (4G) network.

3. The method of claim 2, wherein the mobile communication network component is the NEF, and wherein the traffic source is an internet protocol (IP)-based application running on an application server.

4. The method of claim 3, wherein the IP-based application running on the application server is associated with the UE based on the application flow information.

5. The method of claim 3, further comprising receiving, by the NEF, a HO start signal with an International Mobile Subscriber Identity (IMSI) corresponding to the UE from a third mobile communication network component, and receiving, by the NEF, a HO completion signal with the IMSI corresponding to the UE from the third mobile communication network component to indicate completion of the UE HO.

6. The method of claim 3, wherein the transmitting, by the mobile communication network component, the HO start notification toward the traffic source associated with the UE based on the application flow information further comprises transmitting the HO start notification to a smart traffic handler, and wherein the transmitting, by the mobile communication network component, the HO completion notification toward the traffic source to indicate that the outage time window is closed further comprises transmitting the HO completion notification to the smart traffic handler.

7. The method of claim 5, wherein the third mobile communication network component comprises a session management function component (SMF) and a protocol independent network condition service component (PINCS) to indicate detection of the UE HO, and wherein the HO start notification further comprises an IP address corresponding to the UE.

8. The method of claim 7, further comprising querying, by the NEF, a user plane function component (UPF) to receive the IP address corresponding to the UE when the IP address corresponding to the UE has not been received from the SMF or the PINCS.

9. A network exposure function component (NEF) in a mobile communication network comprising:
   an Internet Protocol (IP) interface to an IP network;
   a network function (NF) message interface to other components of the mobile communication network, the NEF configured to receive user equipment (UE) handover (HO) start signals and HO completion signals from at least one of the other components of the mobile communication network via the NF message interface;
   a memory storage comprising instructions for communicating with applications running on at least one application server in the IP network, and for generating HO start notifications and HO completion notifications; and
   a processor in communication with the IP interface, the NF message interface, and the memory storage, the processor configured to execute the instructions to:
      query a user plane function component (UPF) to receive application flow information associated with a UE, the application flow information identifying the applications to which the UE is subscribed and for which a session with the UE is established during a UE HO;
      transmit a HO start notification to at least one of the applications via the IP interface after receiving a HO start signal via the NF message interface;
      transmit a HO completion notification to the at least one of the applications via the IP interface after receiving a HO completion signal via the NF message interface, the HO start notification indicating that an outage time window is beginning, and the HO completion notification indicating that the outage time window is closed.

10. The NEF of claim 9, wherein the processor is configured to transmit the HO start notification and the HO completion notification to each of the applications associated with the UE based on the application flow information.

* * * * *